United States Patent [19]

Cote

[11] 4,447,765
[45] May 8, 1984

[54] POWER SUPPLY FOR LOW VOLTAGE INCANDESCENT LAMP

[75] Inventor: Paul T. Cote, Cleveland Heights, Ohio

[73] Assignee: General Electric Company, Schenectady, N.Y.

[21] Appl. No.: 379,410

[22] Filed: May 18, 1982

[51] Int. Cl.³ .......................................... H05B 39/04
[52] U.S. Cl. ............................... 315/240; 315/227 R; 315/291; 315/311; 315/DIG. 4; 323/209; 363/62
[58] Field of Search .................... 315/227 R, 240, 291, 315/307, 311, DIG. 4; 307/109; 363/62, 142; 323/209-211, 293, 352, 364, 370, 905

[56] References Cited

U.S. PATENT DOCUMENTS

| | | | |
|---|---|---|---|
| 2,654,042 | 9/1953 | Clarke et al. | 315/58 X |
| 3,274,484 | 9/1966 | Gebhardt et al. | 315/240 X |
| 3,780,347 | 12/1973 | Riesland | 315/247 X |
| 3,921,032 | 11/1975 | Hallay | 315/106 |
| 4,060,752 | 11/1977 | Walker | 315/244 |
| 4,185,231 | 1/1980 | Colliton | 315/189 |
| 4,185,233 | 1/1980 | Riesland et al. | 315/276 |

FOREIGN PATENT DOCUMENTS

| | | | |
|---|---|---|---|
| 208114 | 12/1955 | Australia | 315/291 |
| 532970 | 1/1978 | Japan | 315/291 |
| 263776 | 7/1927 | United Kingdom . | |
| 335618 | 9/1930 | United Kingdom . | |
| 397000 | 8/1933 | United Kingdom . | |
| 979112 | 1/1965 | United Kingdom . | |
| 1241816 | 8/1971 | United Kingdom . | |
| 1329492 | 9/1973 | United Kingdom . | |
| 1350176 | 4/1974 | United Kingdom . | |
| 1358666 | 7/1974 | United Kingdom . | |
| 1415634 | 11/1975 | United Kingdom . | |
| 1555366 | 11/1979 | United Kingdom . | |
| 1567749 | 5/1980 | United Kingdom . | |
| 2077528 | 12/1981 | United Kingdom . | |

OTHER PUBLICATIONS

*SCR Manual Including Triacs and Other Thyristors,* (6th Ed.), General Electric Company (1979), pp. 231-232.

*Primary Examiner*—Eugene R. LaRocke
*Attorney, Agent, or Firm*—John P. McMahon; Philip L. Schlamp; Fred Jacob

[57] ABSTRACT

A power supply providing power to a low voltage lamp utilizing a main capacitor connected electrically in series with the lamp, across an alternating current source, and an auxiliary capacitor connected electrically across the main capacitor by a switching device during selected portions of the source waveform cycle. The minimum lamp current is established by the main capacitor, with additional lamp current flowing through the auxiliary capacitor during portions of the source waveform cycle when the auxiliary capacitor is electrically connected across the main capacitor. The load current is adjusted over a desired range established by the magnitude of the main and auxiliary capacitors.

12 Claims, 4 Drawing Figures

POWER SUPPLY FOR LOW VOLTAGE INCANDESCENT LAMP

CROSS-REFERENCE TO RELATED APPLICATION

U.S. Pat. application Ser. No. 379,411, Paul T. Cote, filed concurrently herewith, for "Improved Capacitively Ballasted Low Voltage Incandescent Lamp" and assigned the same as this invention.

U.S. Pat. application Ser. No. 379,412, Frederic F. Ahlgren, filed concurrently herewith, for "Capacitively Ballasted Low Voltage Incandescent Lamp" and assigned the same as this invention.

U.S. Pat. application Ser. No. 379,393, William P. Kornrumpf and Paul T. Cote, filed concurrently herewith, for "Improved Power Supply For Low Voltage Incandescent Lamp and Like Load" and assigned the same as this invention.

BACKGROUND OF THE INVENTION

The present application relates to low voltage power supplies and more particularly to a capacitively ballasted circuit providing low voltage to an incandescent lamp.

As is well known in the art, incandescent lamps operating at a nominal voltage of approximately 120 volts do not provide as high an efficacy, that is lumens per watt, at the same wattage as incandescent lamps operating at lower voltage levels. Prior art circuitry providing such lower voltage operation either exhibits undesirable cost, volume, weight or high levels of electromagnetic interference. In particular, some prior art low voltage power supplies for incandescent lamps have utilized magnetic components for voltage transformation. The cost of such magnetic components has prevented the resulting power supplied from being economically attractive. Other power supplies have utilized phase-control techniques, in which very narrow pulses are required, with high surge currents flowing through the load; frequently resulting in electromagnetic interference and reduced reliability.

SUMMARY OF THE INVENTION

In accordance with the foregoing, it is an object of the present invention to provide a new and improved power supply for a low voltage incandescent lamp having a relatively low cost and high reliability.

Another object of the present invention is to provide a new and improved power supply for a low voltage incandescent lamp which avoids producing undesirably high levels of electromagnetic interference.

Another object of the present invention is to provide a new and improved power supply for an incandescent lamp in which components therein require relatively low current ratings.

These and other objects are provided by the present invention supplying line frequency current from a higher voltage A-C source to a lower operating voltage lamp and comprises a main capacitor electrically in series with the lamp, the combination thereof electrically connected across the source, and an auxiliary capacitor electrically connected across the main capacitor by a switching device for a selected portion of each source waveform cycle. The switching device is responsive to a signal provided by control logic means. The total variation of load current is controlled by the capacitance ratio of the main capacitor to the sum of the auxiliary and main capacitors.

DETAILED DESCRIPTION

Figure 1:
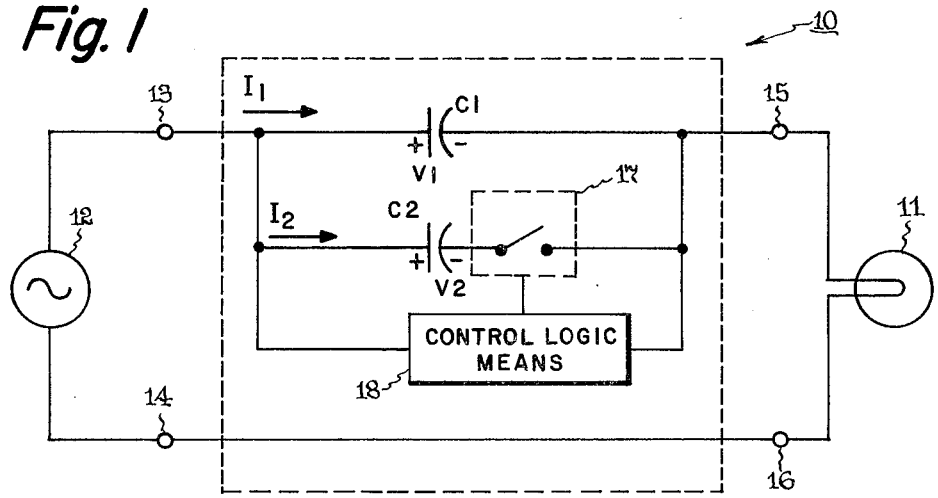
FIG. 1 is a schematical diagram of the present invention.

As shown in FIG. 1 a power supply 10 provides power to a load, preferably an incandescent lamp, 11 from an alternating current (a.c.) source 12. The power supply 10 controls the power supplied to the load 11 from the a.c. source 12. Load 11 can be a low-voltage incandescent lamp operating at a voltage of, for example, between about twenty-four to thirty-six volts. The power supply 10 enables the lamp load 11 to operate at a selectably fixed power output in a relatively small range of brightness. In such application, a relatively small range of lamp voltage can be maintained while the a.c. source 12 current is variable over a predetermined range, for example about 20%.

Power supply 10 forms a dynamic parallel-switched capacitive voltage converter in which the minimum current flowing through the lamp is the current $I_1$ flowing through capacitor C1. An additional component of lamp current is due to the current $I_2$ flowing through capacitor C2. Thus, minimum lamp current and power occur when current does not flow through capacitor C2 during any portion of a source waveform cycle. Conversely, maximum lamp current and power occur when the capacitor current $I_2$ flows during an entire source waveform cycle. An intermediate magnitude of lamp current and power is obtained when the current $I_2$ flows for approximately one-half a source waveform cycle. Therefore, by changing the percentage of a source waveform cycle during which current $I_2$ flows, the load current and power are adjusted.

The a.c. source 12 and lamp 11 are electrically connected to power supply terminals 13-14 and 15-16, respectively. Capacitor C1, hereinafter referred to as the main capacitor, is connected between power supply terminals 13 and 15. Switching means 17 is connected between power supply terminal 15 and one terminal of capacitor C2, hereinafter referred to as the auxiliary capacitor. The remaining terminal of auxiliary capacitor C2 is connected to power supply terminal 13. A control logic means 18 is connected to switching means 17 and terminals 13 and 15. Terminals 14 and 16 are electrically connected directly together.

Switching means 17 can be any device capable of controllably providing a low resistance path between terminal 15 and that terminal of auxiliary capacitor C2 furthest from terminal 13 and responsive to a signal from control logic means 18 to thereby turn switching means 17 into a conductive and non-conductive state. More particularly, switching device 17 is an active switching device, allowing conduction of current therethrough to be actively terminated sometime after the device has been turned on. The time interval between switching device 17 turn-on and turn-off establishes the load current and power magnitude. To prevent undesirable conduction and limit the current flow through switching device 17, switching device 17 is controllably switched "on" by control logic means 18 only when the main capacitor voltage $V_1$ and auxiliary capacitor voltage $V_2$ are substantially equal to substantially eliminate any circulating current flowing between auxiliary capacitor C2 and main capacitor C1.

Figure 2A:
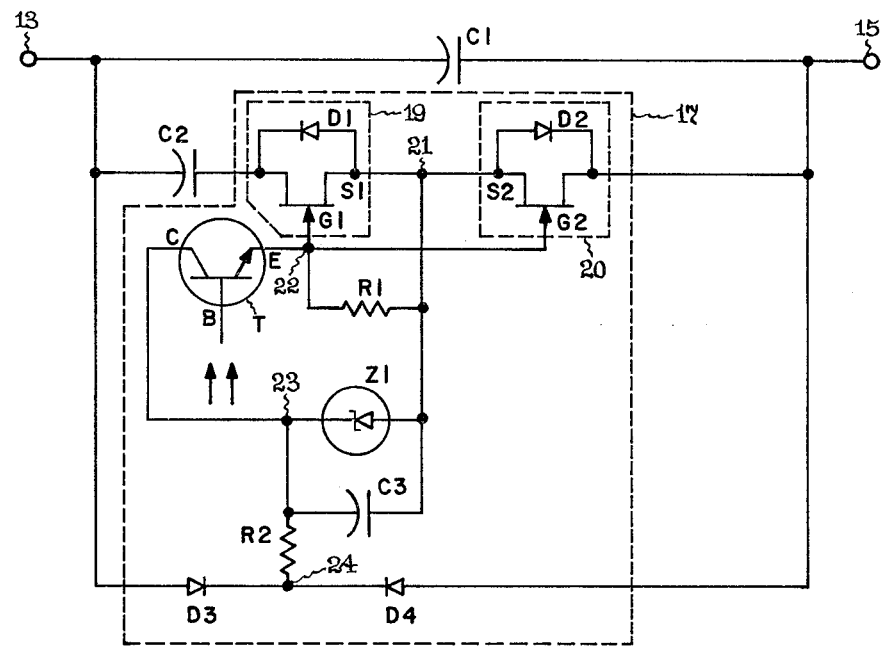
FIGS. 2a and 2b illustrate a schematical representation of a switching and control logic means for connecting the auxiliary capacitor in parallel with the main capacitor.

In a preferred embodiment, and as shown in FIG. 2a, switching means 17 can comprise two field-effect transistors (FETs) 19 and 20, connected electrically at node 21 by their sources S1 and S2 and having parasitic diodes D1 and D2 therein which electrically conduct in opposite directions. Both gates G1 and G2 of FETs 19 and 20, respectively, are electrically connected together at node 22 in order to be switched on and off substantially at the same time. Phototransistor T, which is connected at its collector C to node 23 and at its emitter E to node 22, is triggered into a conductive state by light striking the collector C-base B junction thereof originating from a light-emitting diode LED (FIG. 2b) of control logic means 18. Other elements of switching means 17 include capacitor C3 and zener diode Z1 electrically connected between nodes 21 and 23, resistor R1 electrically connected between nodes 21 and 22, resistor R2 electrically connected between nodes 23 and 24 and diodes D3 and D4 which are electrically connected together at node 24 and electrically connected to nodes 13 and 15 respectively. Diodes D3 and D4 electrically conduct in opposite electrical directions.

Figure 2B:
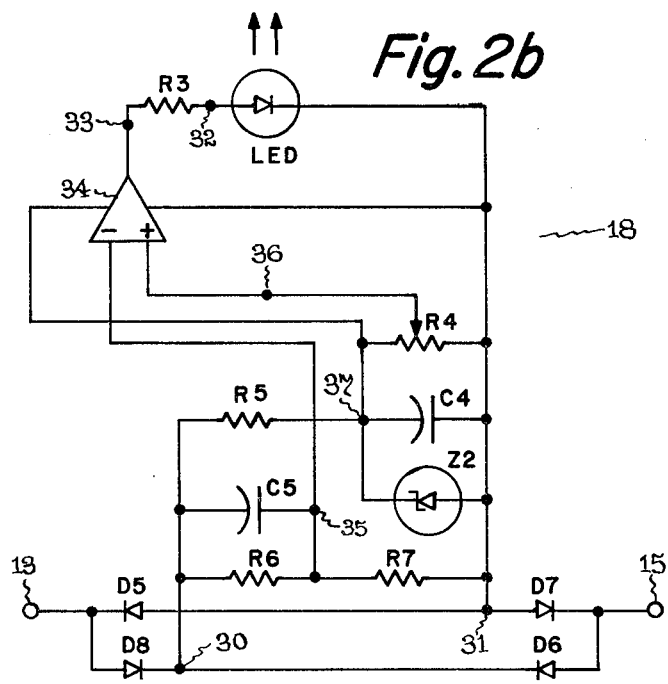

As shown in FIG. 2b, control logic means 18 comprises diodes D5, D6, D7, and D8 electrically connected between terminal 13 and node 31, terminal 15 and node 30, terminal 15 and node 31 and terminal 13 and node 30, respectively. A light-emitting diode LED is electrically connected between nodes 31 and 32 and resistor R3 is electrically connected between nodes 32 and 33. Operational amplifier 34, commonly referred to as a comparator, is electrically connected at its output to node 33, at its inverting input to node 35, at its noninverting input to node 36, at its common supply terminal to node 31, to establish a comparator zero reference voltage, and at its positive supply terminal to node 37, so as to provide a comparator positive supply voltage. Zener diode Z2, capacitor C4 and the two terminals of potentiometer R4, which have a constant resistance therebetween, are electrically connected between nodes 31 and 37 with the third terminal of potentiometer R4 electrically connected to node 36. Resistor R5 is electrically connected between nodes 30 and 37. Resistor R6 and capacitor C5 are electrically connected between nodes 30 and 35.

Operation of power supply 10 can best be understood by beginning with and referring to the control logic means of FIG. 2b. Diodes D5, D6, D7, and D8, as connected and as well known in the art, operate as a full wave rectifier for control logic means 18. As the a.c. source voltage waveform becomes either positive or negative in magnitude, resistor R6 and R7 act as a voltage divider and thereby apply the voltage across R7, $V_{R7}$, to the inverting input of the operational amplifier 34.

Zener diode Z2 establishes a voltage $V_{Z2}$, representing substantially the breakdown voltage of zener diode Z2, and is applied across nodes 31 and 37 of potentiometer R4. During those portions of each a.c. source voltage cycle, when the voltage magnitude across Z2 drops below the breakdown voltage of zener diode Z2, capacitor C4 will discharge relatively slowly and thereby maintain voltage $V_{Z2}$ across nodes 31 and 37 of potentiometer R4. The resistance of resistor R5 determines and is chosen to limit the current flowing through zener diode Z2 to an acceptable level. The resistance of potentiometer R4 between nodes 31 and 36 can be varied to selectably vary the portion of voltage $V_{Z2}$ which is applied to the non-inverting input of operational amplifier 34 and thereby selectably vary the voltage level, hereinafter referred to as the reference voltage $V_R$, which is applied to the non-inverting input of the operational amplifier 34. Capacitor C5 shifts the voltage applied to the inverting input of the operational amplifier 34 and thereby ensures that the signal sent from the control logic means 18 to the switching means 17 arrives at the correct time to turn switching means 17 "on" or "off". More specifically, due to and to compensate for the finite period of time required for FETs 19 and 20 to switch to their conductive states, the signal from control logic means 18 is desirably pushed forward in time by selecting an appropriate value of capacitance for capacitor C5. Thus capacitor C5 corrects for any delays incurred by switching means 17 switching to its conductive state.

Operational amplifier 34 compares the voltages applied to the inverting and non-inverting inputs thereof during each half cycle of a.c. source 12 waveform. Whenever the voltage at the inverting input is greater than the reference voltage $V_R$ at the non-inverting input, the output voltage at node 33 is zero. In contrast thereto, whenever the voltage at the inverting input is equal to or less than the reference voltage $V_R$ at the non-inverting input, the output voltage of the operational amplifier at node 33 is at some positive magnitude resulting in current flowing through the light-emitting diode LED, which is limited by resistor R3. As the current flows through the LED, light is generated thereby, directed to the collector C-base B junction of phototransistor T of switching means 17 and results in turning switching means 17 to its conductive state. Thus when the voltage magnitude applied to the inverting input of the operational amplifier 34 is equal to or below the reference voltage $V_R$ magnitude, control logic means 18 switches switching means 17 to a conductive state.

Switching means 17 similar to control logic means 18 has a full wave rectifier comprising diodes D1, D2, D3 and D4. Zener diode Z1 in combination with capacitor C3 provides a direct current (d.c.) bias voltage between the collector C and emitter E of phototransistor T. More specifically, the d.c. bias voltage is substantially equal to the breakdown voltage of zener diode Z1. During those portions of each voltage cycle where the voltage magnitude across Z1 is less than the zener breakdown, capacitor C3 discharges relatively slowly and thereby maintains a substantially constant d.c. bias voltage between the collector C and emitter E. Resistor R2 serves to limit the current flow through the zener diode Z1 to an acceptable level. The voltage across resistor R1, which serves as the output load for the phototransistor T, is applied between the gates G1 and G2 and sources S1 and S2 of FETs 19 and 20, respectively, to turn both FETs 19 and 20 to their conductive states substantially at the same time. That is, whenever a light signal supplied by the LED of control logic means 18 is received by the collector C-base B junction of the phototransistor T, the signal or an amplification thereof appears across the resistor R1 as a voltage of sufficient magnitude to turn FETs 19 and 20 to their conductive states. Conversely, whenever there is no light signal from the LED, there is an insufficient voltage across G1-S1 and G2-S2 of FETs 19 and 20, respectively, to maintain each FET in or switch each FET to a conductive state.

Figure 3:
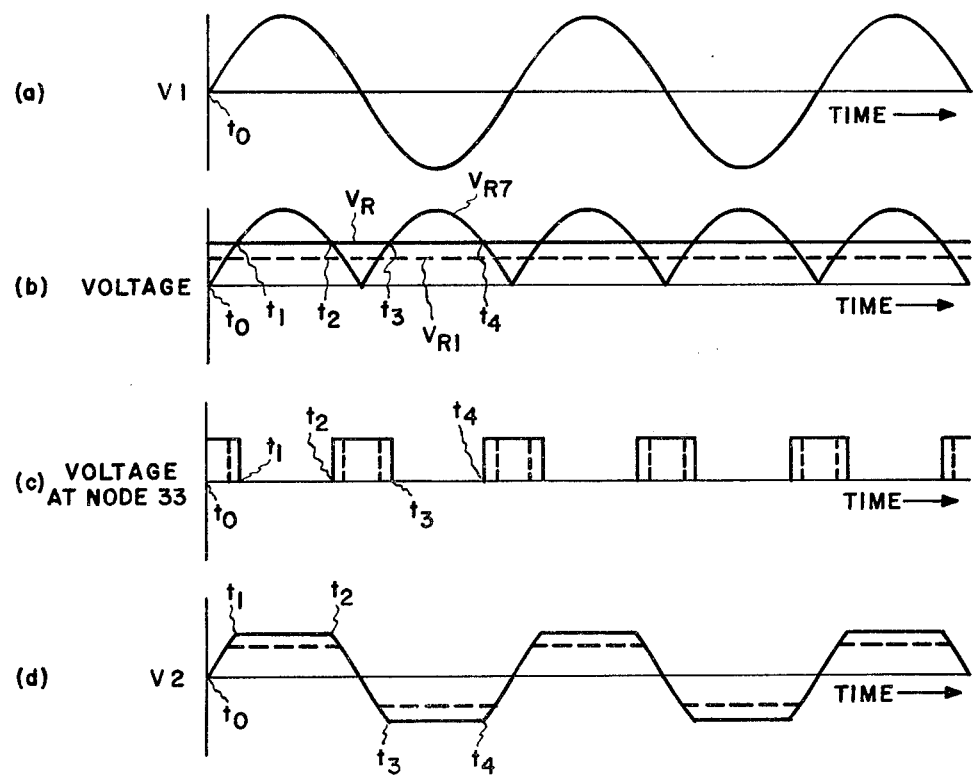
FIG. 3 illustrates a series of time-coordinated graphical representations of the main capacitor, auxiliary capacitor and operational amplifier input and output voltages.

Referring to FIG. 3a, voltage $V_1$, which typically is sinusoidal in waveform, is shown beginning at time $t_0$ at zero volts, and is measured at terminal 13 with respect to terminal 15. Similarly and as shown in FIG. 3b, the voltage at time $t_0$ applied to the inverting input, $V_{R7}$, is zero volts. During the time period $t_0-t_1$, as $V_1$ becomes positive, the reference voltage $V_R$ is greater than or equal to the voltage applied $V_{R7}$ to the inverting input of the operational amplifier 34, resulting in a positive output voltage thereof and causing current to flow through and light to be produced by the light-emitting diode LED. The light emitted by the LED strikes the phototransistor T switching FETs 19 and 20 to a conductive state and thereby placing capacitor C2 electrically in parallel with capacitor C1. Thus the voltage $V_2$ across capacitor C2 is the same as voltage $V_1$ between $t_0-t_1$ At a time somewhat greater than time $t_1$, the inverting input voltage $V_{R7}$ exceeds $V_R$ in magnitude turning switching means 17 off and leaving voltage $V_2$ at a constant magnitude until time $t_2$ when $V_{R7}$ is equal to $V_R$ once again. At time $t_2$ switching means 17 is switched to its conductive state and thereby places capacitors C1 and C2 electrically in parallel once again. $V_1$ and $V_2$ are once again equal until time $t_3$ at which time $V_{R7}$ exceeds $V_R$ resulting in switching means 17 switching to a non-conductive state. $V_2$ remains at the same constant voltage magnitude as occurred between time period $t_1-t_2$ until $V_{R7}$ no longer exceeds $V_R$ in magnitude, that is, until time $t_4$ when switching means 17 is switched to its conductive state. Power supply 10 will continue to operate as heretofore described and thereby provide alternating periods of time when current $I_2$ flows through lamp 11.

Furthermore and as described above substantially no circulating current flows in the electrical loop defined by C1, C2 and switching means 17. More specifically switching means 17 is turned off and then back on at substantially the same voltage magnitude and therefore places capacitor C2 electrically in parallel with capacitor C1 when both $V_1$ and $V_2$ are substantially equal.

Referring to FIG. 3b, when the reference voltage $V_R$ is greater than or equal to the voltage applied to the inverting input of the operational amplifier 34, the output voltage thereof will be represented by the solid lines of FIG. 3c. If, however, the reference voltage $V_R$ is varied in magnitude by adjusting the resistance of potentiometer R4 between nodes 31 and 36, the time duration of the operational amplifier output voltage will vary. If for example a smaller reference voltage $V_{R1}$ is chosen, the time duration of the operational amplifier output voltage, as shown in the dashed lines of FIG. 3c, will be shorter resulting in switching means 17 being turned on for shorter periods of time. The less time that switching means 17 is closed, the less time capacitor C2 wil be electrically connected in parallel with capacitor C1, as represented by the dashed lines of the $V_2$ waveform in FIG. 2d, resulting in less current flowing through the lamp 11. Similarly, reference voltage $V_R$ can be increased in magnitude resulting in longer periods of time when switching means 17 will be turned on, longer periods of time when C2 is placed electrically in parallel with C1, and more current flowing through the lamp 11.

It should be noted that if adjustment in the magnitude of reference voltage $V_R$ is desired, such adjustment should occur during those time periods when switching means 17 is conducting, such as between $t_0-t_1$ or $t_2-t_3$ as opposed to non-conducting periods, such as $t_1-t_2$ or $t_3-t_4$, to ensure that substantially no circulating current flows through switching means 17.

The present invention as disclosed heretofore is able to adjust for a.c. source 12 voltage variations. That is, as the a.c. source 12 voltage increases or decreases in magnitude, the voltage across $V_{R7}$ will proportionally increase or decrease and thereby shorten or lengthen the time duration, respectively, that switching means 17 is turned on and result in a substantially constant flow of current through lamp 11. Furthermore while the load current, power, and brightness have been established by manual adjustment of a variable resistance, that is between nodes 31 and 36 of potentiometer R4, it is to be understood that a control logic circuit can be used, with a feedback signal fed into means for automatically adjusting the resistance between nodes 31 and 36 of R4. Such a feedback signal could, for example, be responsive to the current flow through load 11. Still further, by the present invention utilizing a capacitively ballasted means of providing low voltage across the lamp 11, undesirably high levels of electromagnetic interference are avoided as compared to the prior art. Additionally, the present invention, and more particularly switching means 17, can be manufactured at relatively low costs, with relatively low current ratings, while maintaining high reliability. That is, by having switching means 17 in parallel with C1 and switched on and off to substantially avoid any circulating currents flowing between C1 and C2, switching means 17 can have a relatively low current rating in contrast to such prior art switching means as phase control switching which typically is in series with the higher lamp current.

Another advantage provided by the present invention is in the protection afforded to switching means 17 during high frequency fluctuations of the a.c. source 12. More specifically, by switching means 17 being electrically connected in parallel with C1, any high frequency voltages of the a.c. source 12, for example due to lightning, make C1 appear substantially as a short circuit and thereby are not applied across switching means 17, protecting switching means 17 therefrom.

Therefore, while the present invention has been shown and described in a preferred embodiment, various other embodiments and modifications thereof will now become apparent to persons skilled in the art and will fall within the spirit and scope of the invention as defined in the following claims.

What I claim as new and desire to secure by Letters Patent of the United States is:

1. A power supply providing power to a lamp, having a filament as its load, at a voltage magnitude less than the power supply input voltage magnitude comprising:
   (a) a first capacitive element electrically serially connected with said load across the power supply input terminals;
   (b) a second capacitive element;
   (c) control means connected in parallel across said first capacitive element; and
   (d) a switching means responsive to a control signal generated by said control means for rendering said switching means conductive, said switching means being rendered conductive for electrically connecting said second capacitive element in parallel across said capacitive element during at least a portion of each power supply input waveform cycle.

2. A power supply as defined in claim 1 wherein the second capacitive element has values selected so that the voltage magnitude across each of said first and second capacitive elements are approximately the same each time said switching means is rendered conductive in response to said control signal.

3. A power supply as defined in claim 1 wherein the capacitance of said second capacitive element is less than the capacitance of said first capacitive element.

4. A power supply for providing power to a lamp at a voltage magnitude less than the power supply input voltage magnitude comprising:
   (a) the first reactive element electrically serially connected with said load across the power supply input terminals;
   (b) a second reactive element; and
   (c) a switching means for electrically connecting said second reactive element in parallel across said first reactive element during at least a portion of each power supply input waveform cycle, said switching means comprises two-field effect transistors connected electrically in series having parasitic diodes therein which electrically conduct in opposite directions.

5. A power supply as defined in claim 4 wherein said field effect transistors are conductive substantially at the same time in response to a signal from a logic control means.

6. A power supply as defined in claim 5 wherein said logic control means compares the voltage magnitude across said first reactive element to a reference voltage and switches said field effect transistors to a conductive state when said reference voltage magnitude is approximately equal to or greater than said first reactive element voltage magnitude and to a nonconductive state when said first reactive element voltage magnitude is greater than said reference voltage magnitude.

7. A power supply as defined in claim 6 wherein said comparison occurs each half cycle of said power supply input waveform.

8. A power supply as defined in claim 7 wherein said reference voltage is varied in response to the load current level.

9. A power supply as defined in claim 8 wherein said reference voltage can be varied each power supply input waveform cycle.

10. A power supply as defined in claim 9 wherein said reference voltage variation occurs during conductive periods of said switching means.

11. A power supply as defined in claim 10 wherein said logic control means comprises an operational amplifier, said amplifier having an output providing a variable duration signal whereby said switching means switches to conductive and nonconductive states in response to said signal.

12. A power supply providing power to an incandescent lamp at a voltage magnitude less than the power supply input voltage magnitude comprising:
   (a) a first capacitive element electrically serially connected with said lamp across the power supply input terminals;
   (b) a second capacitive element;
   (c) a switching means including two fieldeffect transistors connected electrically in series and conductive, in response to a signal from a logic control means, substantially at the same time, said transistors having parasitic diodes therein which electrically conduct in opposite directions; and
   (d) said logic control means which includes an operational amplifier, said amplifier comparing the voltage magnitude across said first capacitive element to a reference voltage each half cycle of the power supply input waveform and switching said transistors to a conductive state when said reference voltage magnitude is approximately equal to or greater than said first capacitive element voltage magnitude and into a non-conductive state when said first capacitive element voltage magnitude is greater than said reference voltage wherein said reference voltage can be varied each half-cycle of said power supply input waveform said transistors are conductive, said variation occurring in response to the lamp current level.

* * * * *